Dec. 15, 1959  E. S. DAHL ET AL  2,917,035
FUEL INJECTOR MECHANISM
Filed Sept. 6, 1956
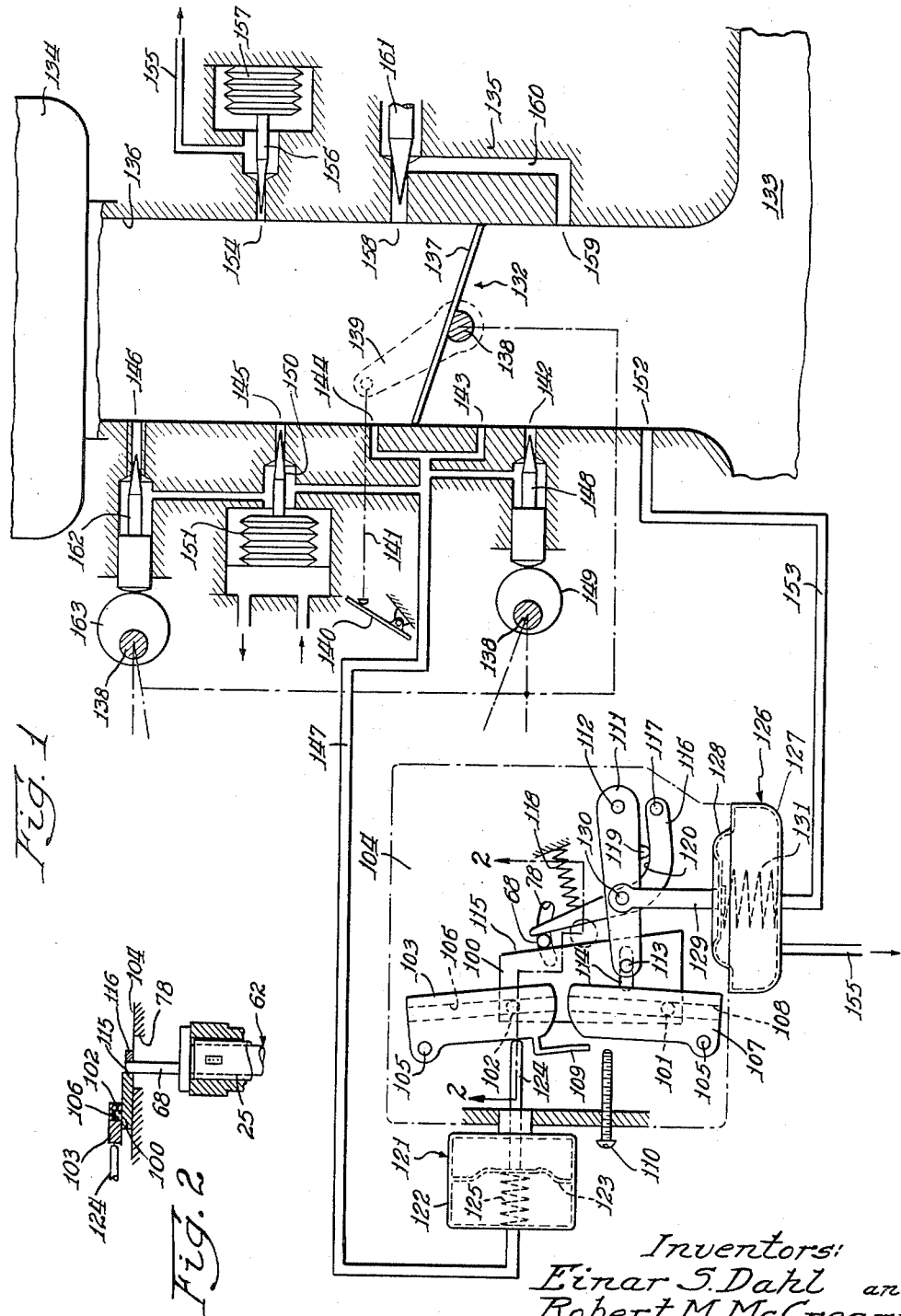
Inventors:
Einar S. Dahl and
Robert M. McCreary
By: Keith J. Bleuer Atty.

United States Patent Office 2,917,035
Patented Dec. 15, 1959

2,917,035

FUEL INJECTOR MECHANISM

Einar S. Dahl and Robert M. McCreary, Decatur, Ill., assignors to Borg-Warner Corporation, Chicago, Ill., a corporation of Illinois Application September 6, 1956, Serial No. 608,269

5 Claims. (Cl. 123—140)

Our invention relates to fuel injector mechanism particularly for use in automotive vehicles.

It has heretofore been proposed to provide a fuel injector pump supplying fuel to fuel nozzles positioned adjacent the cylinders of an automotive vehicle internal combustion engine, with the pump being controlled in accordance with the load on the engine and more particularly in accordance with the manifold pressure of the engine.

We have found that such a control does not exactly satisfy the fuel requirements of the internal combustion engine, particularly as such requirements change with engine speed or with the mass of air that is supplied to the vehicle engine.

It is, accordingly, an object of our invention to control such a fuel injector pump, not only in accordance with engine load and engine manifold pressure, but also in accordance with the speed of the engine and in particular in accordance with changes in the mass of air flow into the engine.

It is a more specific object to provide a pressure responsive control motor effective on the fuel injector pump controlling discharge from the pump and which is controlled from the pressure derived from two orifices that are connected together and are in the air supply passage for the vehicle engine, one of the orifices being located above the throttle fly valve in the air passage and the other orifice being located below the throttle fly valve, the orifices being so located relative to the fly valve and being of such sizes that the pressure derived from them is a pressure that varies inversely with the engine speed.

It is a further object of our invention to provide valve means under the control of the vehicle accelerator controlling an orifice in the air passage located below the throttle fly valve which decreases the pressure from the two orifices mentioned above as the throttle is opened more than a certain amount, for the purpose of decreasing the output of the fuel injector pump further than would be provided under the control of the two orifices, inasmuch as we have found that the fuel requirements above this throttle opening decrease materially.

It is another object to provide additional valve means under the control of the vehicle accelerator and controlling an orifice located above the fly valve which increases the pressure from the two orifices mentioned above until the throttle reaches a predetermined opening which is less than the certain opening mentioned just previously, for the purpose of increasing the output of the fuel injector pump under engine idling conditions beyond that obtainable by the two orifices first mentioned herein.

It is another object to provide valve means for another orifice located above the fly valve and under the control of a temperature responsive device, responsive to the temperature of the vehicle engine, which increases the pressure from the two orifices mentioned first herein under cold operating conditions of the vehicle engine, the temperature responsive device closing the orifice as the engine temperature increases, this thermostatic control being for the purpose of increasing the output of the fuel injector pump under cold operating conditions to satisfy the fuel requirements of the engine.

It is also an object to control the output of the fuel injector mechanism in accordance with changes in pressure in the air intake manifold of the internal combustion engine so that its fuel discharge is responsive to changes in engine load and to provide an orifice above the throttle fly valve which increases the pressure applied to intake manifold pressure sensitive control mechanism above that available from the engine manifold under certain conditions. It is contemplated that a valve shall be provided to control this orifice actuated by an ambient temperature and altitude sensing device for closing the orifice as the ambient temperature increases or as the atmospheric pressure drops.

The invention consists of the novel constructions, arrangements and devices to be hereinafter described and claimed for carrying out the above-stated objects and such other objects as will be apparent from the following description of a preferred form of the invention illustrated with reference to the accompanying drawings, wherein:

Fig. 1 is a schematic view of controlling mechanism for the fuel injector pump associated with the air throttle valve of the vehicle driving internal combustion engine.

Fig. 2 is a sectional view taken along line 2—2 of Fig. 1 showing the relationship between the fuel pump and the linkages which act to control the output of the pump.

Like characters of reference designate like parts in the several views.

Referring to the drawings there is illustrated a control for a fuel injection pump having a reciprocating plunger. The fuel injection pump therein disclosed may be of the type shown in Fig. 1 of U.S. Patent No. 2,851,025 to E. S. Dahl. The pump includes a pumping plunger 25, a rotary valve 62, and a control pin 68. The control pin 68 projects from the fuel injection pump and is movable in a slot 78 and controls the output of the pump.

The control system for the fuel injector pump comprises a cam 100 against which the control pin 68 rests. The cam 100 has fixed thereon a pair of upwardly extending pins 101 and 102. A cam guide plate 103 is swiveled on the upper surface 104 of the fuel injection pump by means of a pin 105. The plate 103 is provided with a groove 106 on the underside thereof in which the pin 102 is slidably disposed.

A second cam guide plate 107 is swiveled on the surface 104 by means of a pin 105 and a groove 108 is provided in the plate 107 on the underside thereof receiving the pin 101 of the cam 100. A pin or more 109 is fixed to the plate 103 and contacts the plate 107 at times, as will be explained. An adjustable stop screw 110 is provided for limiting the counterclockwise swivelling movement of the cam guide 107.

A lever 111 is swiveled on the surface 104 by means of a pin 112, and the lever 111 carries a pin 113 which is disposed in a slot 114 provided in the cam 100.

The control pin 68 rests on the slanted cam surface 115 provided on the cam 100 and is held in such position by means of an arm 116. The arm 116 is swiveled on the surface 104 by means of a pin 117, and a spring 118 acts against the arm 116 holding the pin 68 against the cam surface 115. A boss 119 is carried by the lever 111 and makes contact with a bowed internal portion 120 of the lever 116.

A vacuum motor 121 acts on the cam guide plate 103. The motor comprises a casing 122 having a flexible diaphragm 123 therein. The diaphragm 123 carries a shaft 124 acting on the cam guide plate 103, and a spring 125 is provided between the casing 122 and the diaphragm 123.

A vacuum motor 126 acts on the lever 111. The motor 126 comprises a casing 127 having a flexible diaphragm 128 therein. A connecting rod 129 connects the diaphragm and the lever 111, being connected to the lever by means of a pin 130. A spring 131 is disposed between the casing 127 and the diaphragm 128.

The cam 100 and thereby the control pin 68 are controlled by various pressures (which in general are less than atmospheric pressure) in the air throttle valve 132 supplying air to the engine fuel intake manifold 133 and thereby to the cylinders of the engine. A conventional air cleaner 134 is provided on top of the throttle valve, and the valve comprises a casing portion 135 having an air passage 136 formed therein through which air flows from the air cleaner 134 to the manifold 133. The usual air throttle valve fly plate 137 is disposed in the passage 136, being rotatably mounted therein by means of a shaft 138. The usual throttle lever 139 is fixed on the shaft 138 and may be controlled from the vehicle accelerator 140 by any suitable connection such as a link 141.

The vacuum motor 121 is connected with orifices 142, 143, 144, 145 and 146 in the air passage 136 by means of a conduit 147. The orifices 143 and 144 are disposed adjacent the throttle plate 137, respectively below and above the plate when it is in its illustrated engine idling position. The orifice 142 is disposed beneath the orifice 143 within the manifold 133, and this orifice is closed more or less by means of a valve 148 operated on by a cam 149. The cam 149 is carried by the throttle shaft 138 and causes the piston 148 to open after the throttle shaft moves a predetermined degree from idling position, such as, for example, beyond 20 degrees movement from idling position. The orifice 145 is more or less closed by a valve element 150 carried by a temperature responsive sylphon 151 subject to changes in temperature of the engine. The sylphon 151 is a thin-walled accordion-like structure having temperature responsive fluid therein and may, for example, be subject to the heated air flowing off of the exhaust manifold of the vehicle engine.

The vacuum motor 126 is connected to an orifice 152 in the manifold 133 by means of a conduit 153. The motor 126 is also connected to an orifice 154 located above the fly plate 137, the connection being by means of a conduit 155. A valve 156 more or less closes the orifice 154 and is acted on by a temperature and altitude sensitive sylphon 157. The sylphon 157 may contain a body of temperature responsive liquid and also a body of gas. The liquid changes in volume with changes in temperature and the gas changes in volume with changes in altitude or atmospheric pressure. The sylphon 157 is so placed as to respond to ambient temperature and pressure around the vehicle.

An idling adjustment is preferably provided which comprises two orifices 158 and 159 respectively above and below the fly plate 137. These orifices are connected by means of a conduit 160, and the orifice 158 is more or less closed by a valve element 161 which may be manually controlled by any suitable mechanism.

A valve 162 may be provided if desired for at times closing the port 146. The valve 162 is controlled by means of a cam 163 fixed to the throttle shaft 138, the arrangement being such that the cam shuts the port 146 when the throttle plate 137 is moved beyond a relatively small amount from idling position, such as beyond 6°.

In operation, in brief, the vacuum motor 121 is responsive to the speed of operation of the vehicle engine, particularly by means of the orifices 143 and 144; and the vacuum motor 126 is responsive to the load on the vehicle engine by reason of its connection to the orifice 152 in the manifold; and both of these motors 121 and 126 are effective to move the cam 100 and thereby the control pin 68. It is well-known that internal combustion engines do not have the same volumetric efficiency at all speeds in their working speed range. That is, the mass of air taken into each cylinder during each suction stroke will be less at higher r.p.m. than at low r.p.m., and engines will not necessarily require the same amount of fuel per revolution at high speed as at lower speed. It is likewise a known fact that the desired fuel-air ratio does not necessarily remain constant through the speed range for any given load, for example, one-quarter, one-half or full load.

Our improved controls therefore vary the amount of fuel per revolution of the engine in relation to its speed as well as in relation to its load. The two influences, namely, engine speed and the load on the engine are such that when acceleration is desired and a rich mixture is advantageous, then, both influences tend to move the metering pin 68 and its valve 62 toward rich positions; and since these influences are both acting in the same direction, they move these parts toward rich mixture faster than either one alone can. When a leveling out point of load is reached, then the manifold pressure forces remain constant, and the forces responsive to speed adjust the mixture as required by speed variations only.

The position of the cam 100 in the grooves 106 and 108 of the cam plates 103 and 107, that is, the position of the cam 100 either upwardly or downwardly from its illustrated position in Fig. 1, determines to a large degree the position of the metering valve pin 68 which as previously explained, causes a variation of the output of the plunger 25. The cam plate 100 has its position modified by the positions of the cam plate guides 103 and 107 which are respectively movable around the pins 105.

The control system shown in Fig. 1 functions to move the control pin 68 in a clockwise direction for the purpose of increasing the rate of discharge of the pump per stroke of the plunger 25 when the load on the engine, as evidenced by a change in manifold pressure, increases or when the speed of the engine decreases. The speed effect is evidenced on the mechanism by means of the pressure derived from the orifices 143 and 144 effective through the conduit 147 on the vacuum motor 121.

As is well-known, the pressure that exists in the intake manifold 133 varies directly as the load that is on the engine, in particular the pressure rises as the load increases. This pressure rising with load is applied to the motor 126 through the conduit 153, tending to move the diaphragm 128 and its rod 129 upwardly as the load increases. This movement of the rod 129 is transmitted to the lever 111 which pivots about its pin 112 and, by means of the pin 113 in the slot 114, moves the cam 100 upwardly as seen in Fig. 1. The slanted side 115 of the cam acting on the pin 68 thus moves the pin 68 and metering valve 62 clockwise so as to increase the discharge per stroke of the plunger 25 to satisfy the increased fuel requirements of the engine under these circumstances. Conversely as the load on the engine decreases and the manifold pressure decreases, the diagram 128 in the motor 126 moves downwardly and causes the cam 100 to move downwardly thus causing the pin 68 to move counterclockwise, due to the action of the spring 118, thus decreasing the output by the plunger 25.

The two orifices 143 and 144 disposed in proximity to and respectively below and above the throttle blade 137 provide a pressure in the connected conduit 147 that varies inversely with the speed of the vehicle engine, that is, the pressure decreases as the engine speed increases. The orifice 143 is preferably smaller in diameter than the orifice 144 and in one particular embodiment of our invention, the orifice 143 was .067 inch in diameter and the orifice 144 was .070 inch in diameter. The orifice 144 is preferably placed with respect to the throttle plate 137 so that the adjacent end of the throttle plate 137 comes level with the orifice 144 at a certain throttle opening, such as 25° from idle position.

The two orifices 143 and 144 cooperate to produce this engine speed variable pressure in the conduit 147 as follows: the pressure that exists at orifice 143 is increased by the air bleed at 144 such that the pressure in the conduit 147 is greater than the pressure in the manifold 133. The position of the throttle plate 137 in relation to the orifice 144 determines the extent to which the bleeding of pressure from above the throttle to below the throttle takes place as the throttle blade 137 is opened in varying degrees, the port 144 changing its relative position with respect to the blade 137 from above the blade to below the blade. Initially, when the throttle blade 137 is in idling position, the pressure in the port 143 is manifold pressure and the pressure in port 144 is atmospheric pressure. Air flow thus takes place from port 144 to port 143, and the resultant pressure in the conduit 147 is higher than the pressure in the manifold but lower than the pressure of atmosphere. As the blade 137 opens slightly, then the amount of air that is being bled from port 144 to 143 decreases, thus increasing the pressure in conduit 147. As the end of the blade 137 approaches the orifice 144 with still further throttle opening, the air bled into orifice 144 and flowing to orifice 143 decreases still further, and the resultant pressure in the conduit 147 increases further. As the edge of the blade 137 reaches the orifice 144, the orifice 144 is at that time effectively at manifold pressure, so that flow between the orifices 144 and 143 ceases, and for further throttle openings, the pressure in the conduit 147 varies with manifold pressure only. Thus, in effect, the speed responsive pressure changes in the conduit 147 are obtained during initial throttle openings until the edge of the throttle blade 137 passes slightly beyond the orifice 144.

The engine system responsive pressure in the conduit 147 is applied on the diagram 123, and therefore as the engine speed increases, and the pressure in the conduit 147 decreases, the diaphragm 123 and the associated rod 124 move to the left permitting the cam 100 connected through the cam plate guide 103 with the plunger 124 to move to the left. The control pin 68 thus also moves to the left and reduces the fuel pumped by the plunger 25 for each stroke of the plunger. Conversely, to the above, as the speed of the engine decreases, the plunger 124 is moved by the motor 121 to the right and moves the cam 100 in the same direction against the action of the spring 118 to increase the output by the plunger 25.

In prior constructions, it has been usual to vary the output of a pump of the type shown only in accordance with the load on the vehicle engine as evidenced by changes in manifold pressure. We have found, however, that if only the single control is used responsive to engine load, too much fuel will be pumped by the plunger 25 at higher engine speeds when the pump is set to deliver the correct amount of fuel at lower engine speeds. In other words, assuming that the load as evidenced by the manifold pressure remains the same with various engine speeds, the fuel requirements per revolution of engine are less at higher engine speeds than at lower engine speeds, and therefore we have provided the speed responsive pressure in the conduit 147 and the vacuum motor 121 connected therewith, so as to reduce the output by the plunger 25 per reciprocation at higher engine speeds.

The purpose of the valve 148 and the cam 149 which is controlled by the throttle shaft 138 is to modify the pressure in the conduit 147 produced by the orifices 143 and 144, in particular, to decrease the pressure in the conduit 147 beyond a particular opening of the blade 137, which may be, for example, a 20° opening (less than the opening of the blade 137 as it passes the orifice 144). We have found in some cases that a further reduction of the discharge from the plunger 25 is desired beyond such throttle openings, and the opening of the orifice 142 by the plunger 148 beyond such a movement of the throttle blade 137 provides this decreased output by the plunger 25. If desired, this modification of the pressure in conduit 147 may be dispensed with, and the valve 148 and the orifice 142 may be deleted from the system, simply closing and blocking the small branch of the conduit 147 leading to the valve 148.

The purpose of the orifice 146 is to increase the pressure in the conduit 147 over that provided by the orifices 143 and 144. This increase in pressure is preferable only at small throttle openings, such as below 6°, and therefore the valve 162 is provided which is so controlled by the cam 163 as to close the orifice 146 above a 6° opening of the throttle plate 137. This increase in pressure in the conduit 147 at low throttle openings causes a corresponding increase of fuel to the nozzles adjacent the respective cylinders of the engine for each stroke of the plunger 25, and this increase of fuel is desirable at low throttle openings because internal combustion engines normally demand an increased fuel-air mixture under idling conditions.

The purpose of the orifice 145 in parallel with the orifice 146 is to likewise increase the pressure in the conduit 147 and to increase the output from the plunger 25 to the nozzles adjacent the respective cylinders of the engine. The valve 150 opens the orifice 145 when the engine is cold, and as is well-known, an enrichment of fuel-air mixture for an internal combustion engine is normally demanded under cold operating conditions.

The orifice 154 when opened functions to provide a restricted supply of atmospheric pressure to the vacuum motor 126 through the conduit 155. The sylphon 157 is responsive to the ambient temperature around the vehicle and is responsive to altitude as previously mentioned; and, as is well-known, the fuel requirements of an internal combustion engine decrease with altitude and with increasing ambient temperature. Therefore, the valve 156 is so actuated by the sylphon 157 as to open the orifice 154 with decreasing ambient temperature or with increasing atmospheric pressures and decreasing altitudes. Such opening of the orifice 154 increases the pressure in the vacuum motor 126 and through the cam 100 and metering pin 68 increases the output of the plunger 25 to the nozzles 51.

The purpose of the orifices 158 and 159 and the connecting conduit 160 is to provide for a restricted flow of air around the throttle blade 137 and supply a certain amount of air to the engine for idling conditions. The idling speed is adjusted by means of the manually adjusted valve 161 which opens and closes the orifice 158 as desired.

The purpose of the boss 119 acting on the lever 116 is to move the control pin 68 counter-clockwise to the limit of its movement reducing the fuel output by the plunger 25 to the nozzles adjacent the respective cylinders of the engine to a minimum when the vehicle is decelerating, with the accelerator being completely released and the throttle blade 137 being closed, and the vehicle is in effect driving the engine. Ordinarily, when the engine is driving, the minimum pressure that is in the vacuum motor 126 is approximately 9 inches of mercury. When the relatively unusual conditions exist, however, in which the vehicle drives the engine, this pressure decreases still further to approximately 6 or 7 inches of mercury. Under the latter conditions, the lever 111 is moved downwardly, the boss 119 contacts the curved portion 120 of the lever 116 and rotates the lever 116 counterclockwise about its pin 117, so that the pin 68 is moved by the lever 116 to the limit of movement in the slot 78. The cam 100 may be in position to block this movement of the pin 68; however, the spring 125 in the motor 121 yields under these conditions to permit yielding movement by the cam 100 and the cam guide 103 permitting the pin 68 to move to the limit of its movement. This movement of the pin 68 reduces under these conditions the output of the plunger 25 to the nozzles adjacent the respective cylinders of the engine to a minimum, reducing waste of fuel and undesirable odors of unburned hydrocarbons in the engine exhaust.

The purpose of the adjusting screw 110 is to set the maximum output for the plunger 25. The screw 110 is set when the cam 100 is at the limit of its movement upwardly as seen in Fig. 1 to provide the desired maximum output of the plunger 25.

The purpose of the arm 109 is for moving the plate 107 by means of the plate 103 when the vehicle is being quickly accelerated. When the accelerator 140 is moved quickly toward an open throttle position, the engine demands increased fuel; and, under these conditions, the pressure in the conduit 147 suddenly increases so as to move the diaphragm 123 and the plunger 124 to the right causing a corresponding counter-clockwise swiveling movement of the guide 103. Under these conditions, the arm 109 contacts the plate 107 causing a corresponding clockwise swiveling movement of the guide 107. Since the pins 101 and 102 of the cam 100 are in the grooves 106 and 108 of the guides 103 and 107, the cam 100 is likewise given a sudden movement to the right, moving the control pin 68 in the same direction and suddenly increasing the output by the plunger 25 to the nozzles adjacent the respective cylinders of the engine.

We wish it to be understood that our invention is not to be limited to the specific constructions and arrangements shown and described, except only insofar as the appended claims may be so limited, as it will be understood by those skilled in the art that changes may be made without departing from the principles of the invention. In particular, we wish it to be understood that the invention is not to be limited to the specific sizes of the orifices in the control system that we have mentioned nor to the specific throttle openings that we have mentioned at which certain valves in the system are opened or closed.

We claim:

1. In a fuel injection apparatus for an internal combustion engine having a rotatable power delivery shaft and an air intake manifold, the combination of a fuel delivery pump driven by the engine and supplying fuel to the engine, a throttle valve movably disposed in an air inlet passage for the engine for varying the supply of air to said intake manifold, means responsive to changes in pressure in said intake manifold for increasing the output of said pump as the pressure in the manifold increases, and means variable with the speed of said engine for decreasing the output of said pump per revolution of the shaft as the engine speed increases, said last-named means including an orifice provided in said air passage above said throttle valve connected with an orifice in said air passage below said throttle valve providing a pressure that varies with engine speed, and additional means for further decreasing the output of said pump above a predetermined throttle opening and including an additional orifice disposed below said throttle valve and connected with said first-named two orifices and a valve controlled by said throttle valve opening said last-named orifice above said pre-determined throttle opening.

2. In a fuel injection apparatus for an internal combustion engine having a rotatable power delivery shaft and an air intake manifold, the combination of a fuel delivery pump driven by the engine and supplying fuel to the engine, a throttle valve movably disposed in an air inlet passage for the engine for varying the supply of air to said intake manifold, means responsive to changes in pressure in said intake manifold for increasing the output of said pump as the pressure in the manifold increases, means variable with the speed of said engine for decreasing the output of said pump per revolution of the shaft as the engine speed increases, said last-named means including an orifice provided in said air passage above said throttle valve connected with an orifice in said air passage below said throttle valve and together providing a pressure that varies with engine speed, and engine temperature responsive means for decreasing the output of said pump as the temperature of said engine increases and including an additional orifice disposed in said air passage above said throttle valve and connected with said first-named two orifices and a temperature responsive device controlling a valve for closing said last-named additional orifice as the engine temperature increases.

3. In a fuel injection apparatus for an internal combustion engine having a rotatable power delivery shaft and an air intake manifold, the combination of a fuel delivery pump driven by the engine and supplying fuel to the engine, a throttle valve movably disposed in an air inlet passage for the engine for varying the supply of air to said intake manifold, means responsive to changes in pressure in said intake manifold for increasing the output of said pump as the pressure in the manifold increases, means variable with the speed of said engine for decreasing the output of said pump per revolution of the shaft as the engine speed increases, said last-named means including an orifice provided in said air passage above said throttle valve connected with an orifice in said air passage below said throttle valve together providing a control pressure that varies with engine speed, and additional means responsive to throttle valve position for decreasing the discharge by said pump as the throttle valve opens above a pre-determined opening and including an orifice disposed above said throttle valve and connected with said first-named orifices and a valve for closing said last-named orifice and means controlled by said throttle valve for closing said last-named orifice as the throttle valve moves beyond said predetermined opening.

4. In a fuel injection apparatus for an internal combustion engine having a rotatable power delivery shaft and an air intake manifold, the combination of a fuel pump having a reciprocable plunger for supplying fuel to the engine, a first pressure responsive diaphragm connected to said manifold and to said pump for increasing the output of said pump, as pressure in said manifold changes with increasing load on the engine, a throttle comprising an air inlet passage to the intake manifold and a throttle plate movably disposed in said passage, and a second pressure responsive diaphragm variable with the speed of said engine for decreasing the output of said pump per stroke of the plunger with each revolution of said shaft as the engine speed increases, said last named means including an orifice opening into said air passage above said throttle plate in a closed throttle position and connected with said second pressure responsive diaphragm, said orifice being located adjacent said throttle plate so that said orifice at a closed throttle position is subject primarily to atmospheric pressure above said throttle plate and in increasingly subject to manifold pressure as said throttle plate is opened.

5. In a fuel injection apparatus for an internal combustion engine having a rotatable power delivery shaft and an air intake manifold, the combination of a fuel delivery pump having a reciprocable plunger and driven by the engine and supplying fuel to the engine, a throttle plate movably disposed in an air inlet passage for the engine for varying the supply of air to the engine intake manifold, a first diaphragm connected to said pump and responsive to changes in pressure in said intake manifold with load on the engine for increasing the output of said pump as pressure in said manifold increases, and means variable with the speed of the engine for decreasing the output per stroke of said pump plunger as the engine speed increases, said speed variable means including a second diaphragm also connected with said pump and an orifice opening into said air passage above said throttle plate in a closed throttle position and connected with an orifice opening into said passage below said throttle plate for providing a pressure to said second diaphragm that varies with total air flow and hence with engine speed, said first named orifice being located adjacent said throttle plate so that said orifice at closed throttle position is subject to the atmospheric pressure above said throttle plate and is increasingly subject to manifold pressure as said throttle plate is opened, becoming primarily subject to manifold pressure as compared to atmospheric pressure above said plate above a predetermined opening of said throttle plate.

References Cited in the file of this patent

UNITED STATES PATENTS

| | | |
|---|---|---|
| 2,093,984 | Schweizer | Sept. 21, 1937 |
| 2,229,048 | Colell | Jan. 21, 1941 |
| 2,341,257 | Wunsch | Feb. 8, 1944 |
| 2,435,902 | Reggio | Feb. 10, 1948 |
| 2,623,510 | Schweizer | Dec. 30, 1952 |
| 2,821,184 | Groezinger | Jan. 28, 1958 |

OTHER REFERENCES

Ser. No. 314,190, Hurst (A.P.C.), published May 11, 1943.